(12) United States Patent
Zelenov et al.

(10) Patent No.: US 11,036,764 B1
(45) Date of Patent: Jun. 15, 2021

(54) DOCUMENT CLASSIFICATION FILTER FOR SEARCH QUERIES

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Singapore (SG)

(73) Assignee: Parallels International GmbH, Schaffausen (CH)

( * ) Notice: Subject to any disclaimer, the term of this patent is extended or adjusted under 35 U.S.C. 154(b) by 203 days.

(21) Appl. No.: 15/405,143

(22) Filed: Jan. 12, 2017

(51) Int. Cl.
| | |
|---|---|
| *G06F 16/00* | (2019.01) |
| *G06F 16/28* | (2019.01) |
| *G06N 7/00* | (2006.01) |
| *G06N 20/00* | (2019.01) |
| *G06F 16/93* | (2019.01) |
| *G06F 16/245* | (2019.01) |

(52) U.S. Cl.
CPC .......... *G06F 16/285* (2019.01); *G06F 16/245* (2019.01); *G06F 16/93* (2019.01); *G06N 7/005* (2013.01); *G06N 20/00* (2019.01)

(58) Field of Classification Search
CPC ......... G06F 17/30598; G06F 17/30705; G06F 17/30011; G06F 16/285; G06F 16/35; G06F 16/355; G06F 16/245; G06F 16/93; G06N 7/005; G06N 20/00
USPC ....................................................... 707/722
See application file for complete search history.

(56) References Cited

U.S. PATENT DOCUMENTS

| | | | | | |
|---|---|---|---|---|---|
| 5,924,105 | A * | 7/1999 | Punch, III | ............ | G06F 40/284 715/234 |
| 6,012,053 | A * | 1/2000 | Pant | ...................... | G06F 16/338 |
| 6,038,557 | A * | 3/2000 | Silverstein | .......... | G06F 17/3071 |
| 6,393,460 | B1 * | 5/2002 | Gruen | .................. | G06Q 10/107 709/204 |
| 6,751,614 | B1 * | 6/2004 | Rao | ....................... | G06F 16/355 |
| 8,046,363 | B2 * | 10/2011 | Cha | ........................ | G06F 16/355 707/739 |
| 9,177,050 | B2 * | 11/2015 | Lu | .......................... | G06Q 10/10 |
| 2004/0148278 | A1 * | 7/2004 | Milo | ..................... | G06F 17/2205 |
| 2004/0268218 | A1 * | 12/2004 | Atkin | .................... | G06F 16/957 715/205 |
| 2006/0155662 | A1 * | 7/2006 | Murakami | .............. | G06F 16/35 706/20 |
| 2008/0168054 | A1 * | 7/2008 | Lee | .................... | G06F 17/30696 |
| 2008/0209339 | A1 * | 8/2008 | Macadaan | ............. | G06F 3/0482 715/745 |
| 2010/0023515 | A1 * | 1/2010 | Marx | .................... | G06F 16/285 707/E17.005 |
| 2010/0057677 | A1 * | 3/2010 | Rapp | ....................... | G06F 16/25 707/E17.014 |

(Continued)

*Primary Examiner* — Vincent F Boccio
(74) *Attorney, Agent, or Firm* — Lowenstein Sandler LLP (57) ABSTRACT

A document classifier, executed by a processing device, groups a plurality of stored documents using machine learning to create a plurality clusters that each include documents having similar characteristics. The document classifier further determines a document classification for each of the plurality of clusters based on a subset of the documents in each respective cluster. In addition, the document classifier associates a determined document classification with each of the plurality of documents, wherein resulting classifications of documents are used to filter search results in response to queries of end users.

14 Claims, 8 Drawing Sheets

(56) References Cited

U.S. PATENT DOCUMENTS

| | | | |
|---|---|---|---|
| 2010/0332520 A1* | 12/2010 | Lu ........................ | G06Q 10/10 |
| | | | 707/769 |
| 2011/0047156 A1* | 2/2011 | Knight .............. | G06F 17/30705 |
| | | | 707/737 |
| 2011/0184950 A1* | 7/2011 | Skaff ................. | G06K 9/00664 |
| | | | 707/737 |
| 2017/0293625 A1* | 10/2017 | Nachlieli ............... | G06Q 30/01 |

* cited by examiner

DOCUMENT CLASSIFICATION FILTER FOR SEARCH QUERIES

TECHNICAL FIELD

Embodiments of this disclosure relate generally to computer systems and, more specifically, relate to a document classification filter for searching the contents of documents in computer systems.

BACKGROUND

A search engine is a computer system that is configured to search for information, either on a local machine, on a local network or on the Internet. Results of searches can be presented via user interfaces in a list of results that may include lists of web pages, images, documents, files or any other types of objects. Results for document searches can be presented in a list of results that can include names of documents, storage locations of documents, text strings within documents, or the like. In a large repository, however, the results of a document search can often be voluminous, particularly if relatively common search terms are used, thus making it difficult to locate a particular document of interest.

BRIEF DESCRIPTION OF THE DRAWINGS

Embodiments of the present disclosure will be understood more fully from the detailed description given below and from the accompanying drawings, which, however, should not be taken to limit the present disclosure to the specific embodiments, but are for explanation and understanding only.

DETAILED DESCRIPTION

Described herein are methods and systems for enabling and implementing a document classification filter for searching the contents of documents in a document repository. Whether on a local machine, on a local network or on the Internet, a user may desire to locate a particular document or set of documents. One method may be to use a keyword or key-phrase search query, where the user provides an input string search term to a search engine including one or more words of interest. The search engine may scan a repository for documents, the contents of which include the keyword or key-phrase, and provide a list of the results. In a large repository, or when a relatively common search term is used, there may be a very large number of results, making it difficult for the user to identify a particular document of interest.

In one embodiment, the document classification system described herein allows for classification of documents by the type of content they include. Without respect to the type of file (e.g., images, word processing documents, emails, web pages, etc.), the document classification system may identify a document classification associated with a document based on the content of the document. Examples of these classifications may include technical documentation, feature descriptions, source code, marketing documents, sales documents, etc. To manually assign a classification to each document in a repository would be an overwhelming task, but machine learning classification can be used to expedite and improve the process and to allow for classification of documents containing non-human readable text.

In one embodiment, a document classifier uses unsupervised machine learning, such as a clustering algorithm, to group stored documents into clusters that each include documents with similar characteristics. Some examples of the characteristics used in clustering may include the document title, author, date/time the document was created, document mime type, document size, an indication of a certain number of normalized words having the highest count in the text (excluding proper nouns), an indication of words having a high term frequency-inverse document frequency (TF-IDF), an indication of a certain number of proper nouns appearing in in the text, the presence of certain symbols, word count, headings, or the like. Once the documents have been grouped into clusters, the document classifier may determine a document classification for each of the clusters based on a subset of documents in a respective cluster. In one embodiment, the document classifier identifies some number of representative sample documents from the cluster and receives a corresponding document classification (e.g., from an administrator or other source). The document classifier may then use supervised machine learning to develop a learned classifier function and apply the learned classifier function to the stored documents to determine a document classification for each document. If certain documents in a particular cluster are not classified with the same document classification by the learned classifier function, the document classifier may create a new cluster for those documents and attempt to classify them in a similar manner.

Once the documents in the repository have been classified and an indication of those classifications stored in either a search index or in metadata corresponding to each document, the classification can be used to improve the search process. For example, in addition to including a particular search term, a search query may further include the selection of one or more document classifications. These classifications can be used to further filter the results, increasing the chances of locating the document of interest. Filtering by certain classifications may also enable the computing device running the search engine to execute the search query faster and more efficiently, as it need not search every document in the repository for the provided search terms.

Figure 1:
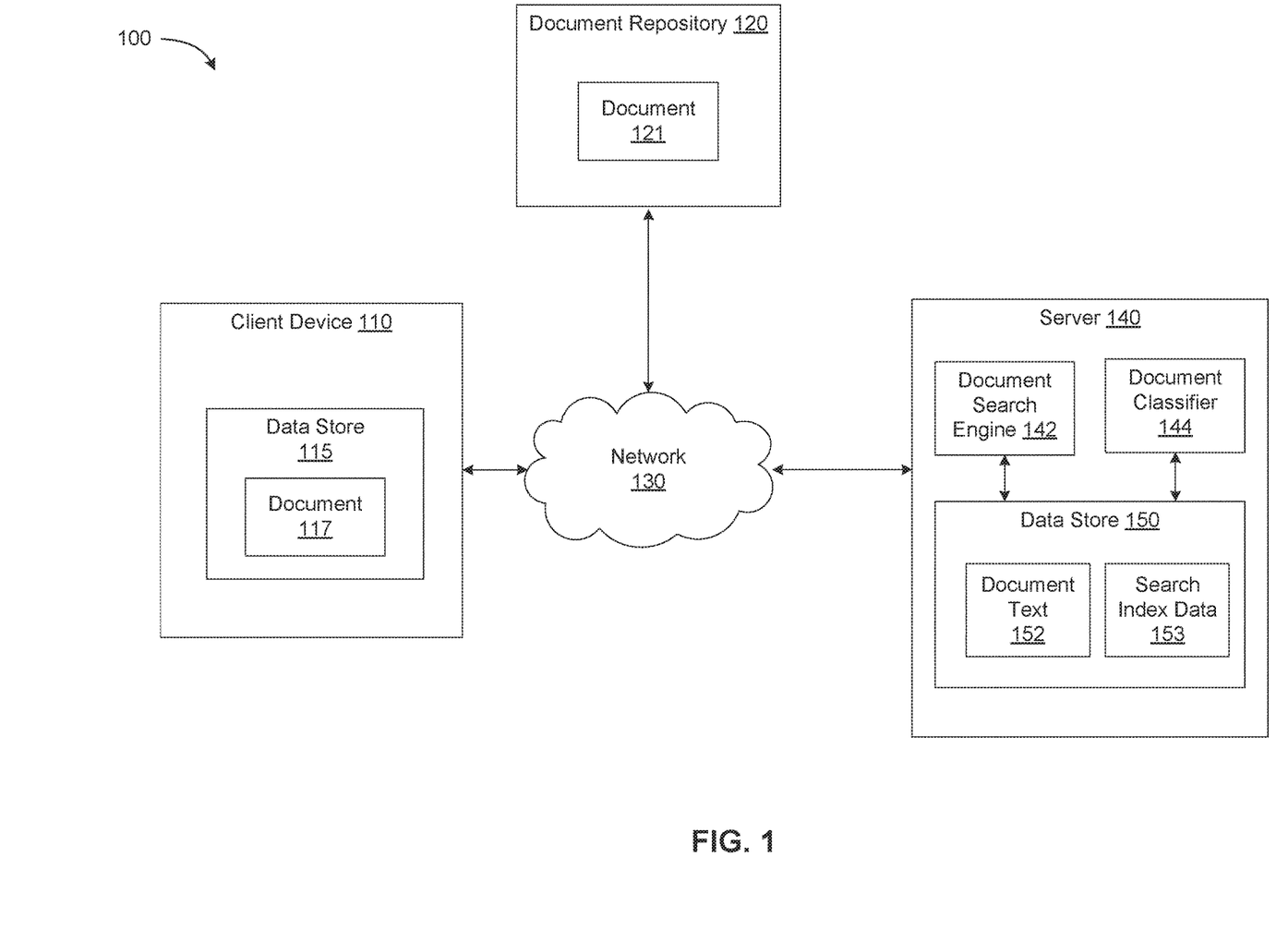
FIG. 1 is a block diagram illustrating a networked environment in which embodiments of the present disclosure may be implemented.

FIG. 1 is a block diagram illustrating a networked environment 100 in which embodiments of the present disclosure may be implemented. The networked environment 100 can include one or more client devices 110, one or more servers 140, and one or more document repositories 120, which can be in data communication with each other via network 130. Computer system 800 illustrated in FIG. 8 may be one example of any of client devices 110 or servers 140. The network 130 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Client devices 110 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability. In one embodiment, client device 110 includes a data store 115 that stores one or more documents 117 for a user of the client device.

Client device 110 may communicate with one or more document repositories 120 that may store documents (e.g., documents 121) for the user of the client device. In some implementations, document repository 120 may be a local document storage system within a local area network. For example, document repository 120 may be a file system accessible via a network attached storage (NAS) system, a shared network directory, or the like. In some implementations, document repository 120 may be a cloud based document storage system that is accessible to client device 110 via the Internet. For example, document repository 120 may be Dropbox®, Google Drive®, Apple's iCloud Drive®, Amazon Drive®, or any other similar cloud-based storage system. Although, for simplicity, only one document repository 120 is depicted, in some embodiments, client device 110 may communicate with multiple document repositories 120.

Documents 117, 121 may be any type of document that includes text that may be indexed and located using a search engine. For example, documents 117, 121 may include a word processing document, a presentation document, a spreadsheet, an image that has been processed by optical character recognition (OCR) to embed text with the image, a markup document (e.g., hypertext markup language (HTML), extensible markup language (XML), etc.), or the like. In some implementations, documents 117, 121 may also include text messages, online chat transcripts, email messages, or any other similar type of document. In various embodiments, the text within documents 117, 121 may include multiple characters that may in turn form multiple words.

Server 140 may include, for example, a server computer or any other system providing computing capability. Alternatively, server 140 may employ a plurality of computing devices that may be arranged, for example, in one or more server banks or computer banks or other arrangements. Such computing devices may be positioned in a single location or may be distributed among many different geographical locations. For example, server 140 may include a plurality of computing devices that together may comprise a hosted computing resource, a grid computing resource and/or any other distributed computing arrangement. In some cases, server 140 may correspond to an elastic computing resource where the allotted capacity of processing, network, storage, or other computing-related resources may vary over time.

In some implementations, server 140 can include a document search engine 142, document classifier 144 and a data store 150. Document search engine 142 can manage the parsing, analyzing, and searching of documents 117 stored on client device 110 and/or documents 121 stored in document repositories 120 in order to facilitate input prediction for searching the content (e.g., the text) within documents 117, 121. In some implementations, document search engine 142 may be invoked via a request received from a user of client device 110. The user may interact with the document search engine 142 via a graphical user interface on client device 110 to initiate analyzing and indexing of the user's documents stored either locally on client device 110 or in document repository 120, and subsequently initiate searches of those documents.

In some implementations, server 140 can include a data store 150 that may store document text 152 and search index 153. Data store 150 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

Document text 152 may be a data structure that stores entries that are each associated with one of the user's documents 117 stored on client device 110 or documents 121 stored in document repository 120. Document text 152 may include multiple entries, each associated with one of the user's stored documents analyzed and indexed by document search engine 142, where each entry includes the textual content of one of the user's documents. In some implementations, a single entry may contain the entire textual content of a single document. Alternatively, the textual content of a single document may be made up of multiple entries that are linked together. Each entry may additionally include a unique document identifier associated the location of the document, a unique identifier associated with the user associated with the document or other similar identifying information. Document text 152 may be stored as a database of text content, a linked list, a log based data structure, or in any similar manner.

In an illustrative example, document search engine 142 can initiate the analysis and indexing of documents 117, 121. In some implementations, document search engine 142 may receive a notification from a user interface of client device 110 to initiate the indexing of documents 117, 121. Alternatively, a component of document search engine 142 may execute independently of client device 110 as a background task of server 140 to monitor the contents of data store 150 and/or document repository 120 and initiate indexing of a new document added to either repository, an existing document that is modified, or the like.

Document search engine 142 may obtain a document from data store 117 and/or document repository 120 and load the document into a memory space of server 140 for processing. Alternatively, document search engine 142 may load the document into temporary storage on server 140. Once the document has been obtained, document search engine 142 may then parse the document to extract the textual content from the document, generate a unique document identifier associated with the location of the document, determine a unique user identifier associate with the user, and store the information in document text 152.

In some implementations, the unique document identifier may indicate the storage repository 120 that stores the document. Additionally or alternatively, the unique identifier may indicate the location within the document repository 120 (or the location in the data store 115 on client device 110) where the document is stored (e.g., the directory structure within the file system). For example, the unique identifier may include a uniform resource locator address (URL) of the document within document repository 120. In one embodiment, the unique identifier may be a hash value of the location information, which may then be encoded to generate an encrypted hash value.

In some implementations, document classifier 144 may determine a document classification of documents in document repository 120 or data store 115 for use as filters in a search query performed by document search engine 142. Document classifier 144 may classify the documents by the type of content they include. Without respect to the type of file (e.g., images, word processing documents, emails, web pages, etc.), document classifier 144 may identify a classification associated with a document based on the content of the document. Examples of these classifications may include technical documentation, feature descriptions, source code, marketing documents, sales documents, or any other unique type of document.

In some implementations, document classifier 144 may extract document metadata from each document obtained. The document metadata may include the document title, author, date/time the document was created, document mime type, document size, an indication of a certain number of normalized words having the highest count in the text (excluding proper nouns), an indication of words having a high term frequency-inverse document frequency (TF-IDF), an indication of a certain number of proper nouns appearing in in the text, the presence of certain symbols, word count, headings, or the like. The TF-IDF value may reflect how important a particular word is to a document in a collection, as it generally increases proportionally to the number of times a word appears in a given document, but is offset by the frequency of the word throughout the whole collection. Thus the TF-IDF value emphasizes the importance of the word to in the particular document. In one embodiment, document classifier 144 adds an indication of the determined classification to the metadata in an entry of search index data 153 corresponding to the particular document. In another embodiment, document classifier 144 adds an indication of the determined classification to metadata stored with the document itself (e.g., in document repository 120 or data store 115.) Document classifier 144 may then index the textual content, the document metadata, unique document identifier, document location and document classification to generate search index data 153 to be used to process subsequently received search queries of the textual content of the user's documents.

Once the textual content has been analyzed by document classifier 144, document search engine 142 may subsequently receive input text from the client device 110. The input text may be entered by the user into a user interface that is presented on client device 110. The user interface may present an input field for the user to enter a search string to search the content (e.g., the text) within documents stored either locally or in document repository 120. The user interface may be provided by an application executing on the client device 110, which may be a mobile application (mobile app), a desktop application, a web browser, or the like. Document search engine 142 may further receive an indication of a particular document classification through the user interface presented on client device 110. Document search engine 142 may use the document classification to filter the results of the search query.

Document search engine 142 may then access search index data 153 to identify the documents that include the string in the search query (e.g., any document whose textual content includes the search query string) and have the corresponding document classification filter type, and return the results to client device 110. In some implementations, the search results may include metadata associated with the document (e.g., document title) as well as the location of the document (e.g., the URL for the document within the document repository, the location of the document on the client device, etc.). Additional details of document search engine 142 and document classifier 144 are provided below with respect to FIGS. 2-7.

Figure 2:
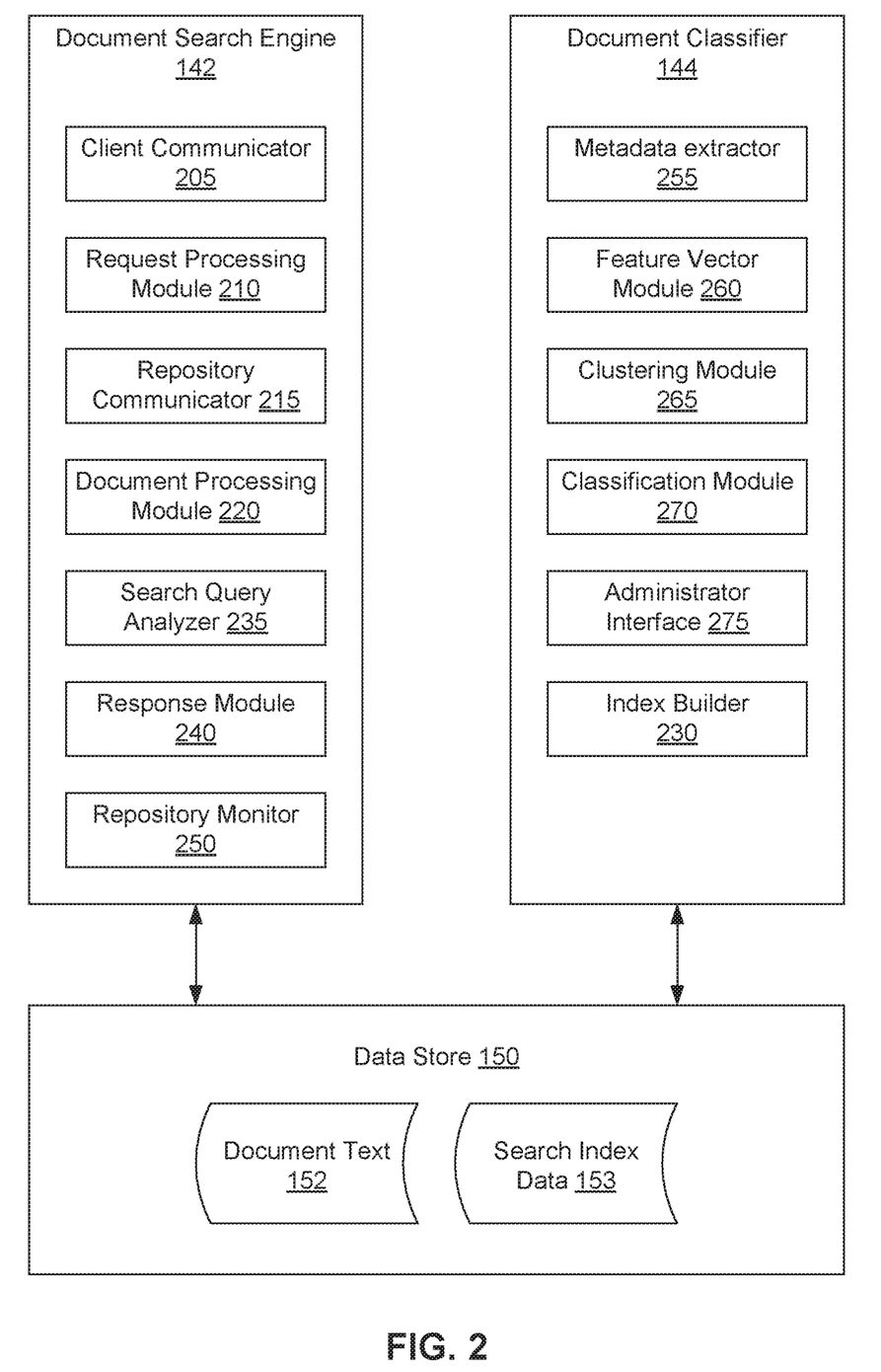
FIG. 2 is a block diagram illustrating a document search engine and document classifier, according to an embodiment.

FIG. 2 is a block diagram of one embodiment of a document search engine 142 and document classifier 144 showing logical modules that may be loaded into and executed by a processing device of server. In some implementations, document search engine 142 can include user client communicator 205, request processing module 210, repository communicator 215, document processing module 220, search query analyzer 235, response module 240, and repository monitor 250. In some implementations, document classifier 144 can include metadata extractor 255, feature vector module 260, clustering module 265, classification module 270, administrator interface 275 and index builder 230. This arrangement of modules and components may be a logical separation, and in other embodiments, these modules or other components can be combined together or separated in further components. In some implementations, the components of document search engine 142 and document classifier 144 may be combined together in a single logical construct that is configured to provide both the search and classification functionality. In some implementations, the components of document search engine 142 and document classifier 144 may be included on a single server (e.g., server 140 of FIG. 1). Alternatively, the components of document search engine 142 and document classifier 144 may be divided across multiple servers.

In some implementations, data store 150 may be connected to document search engine 142, and can include document text 152 and search index data 153. In one embodiment, a single server (e.g., server 140 of FIG. 1) may include document search engine 142, document classifier 144 and data store 150. In another embodiment, data store 150 may be on a different server from that of document search engine 142 and document classifier, and may be accessible over a network or other connection.

In an illustrative example, document search engine 142 may maintain document text 152 that includes entries that are each associated with one of the user's documents stored on client device 110 or in document repository 120. Document text 152 may include multiple entries, each associated with one of the user's stored documents analyzed and indexed by document search engine 142 and document classifier 144, where each entry includes the textual content of one of the user's documents. As noted above, each entry in document text 152 may contain the entire textual content of a single document. Alternatively, the textual content of a single document may be made up of multiple entries that are linked together. Each entry may additionally include a unique document identifier associated the location of the document, a unique identifier associated with the user associated with the document or other similar identifying information. Document text 152 may be stored as a database of text content, a linked list, a log based data structure, or in any similar manner.

To maintain document text 152, document search engine 142 obtains a user's documents from a client device data store 115 or a document repository 120, parses the documents, and extracts the textual content from those documents. Client communicator 205 may receive a request from a client device to initiate the process. Client communicator 205 may be invoked by a communication request sent by the user interface of a client device (e.g., client device 110 of FIG. 1). The user interface may be a window, a dialog box, a prompt for textual input, or the like. A user may enter a request to index one or more documents (e.g., documents 117, 121 of FIG. 1), which can cause the client communicator 205 to invoke request processing module 210 to process the request and begin analyzing and indexing the documents.

Document processing may also be performed independently of a specific user request. For example, repository monitor 250 may monitor the contents of a document repository and initiate indexing of a new document added to the repository, an existing document that is modified, or the like. Alternatively, repository monitor 250 may receive a notification from the document repository that a document has been modified, and subsequently send a request to the document repository to obtain the document for processing.

Request processing module 210 may receive information from the user to enable document search engine 142 to analyze and index the documents of a document repository. For example, request processing module 210 may receive the login credentials of the user for the document repository 120 to grant document search engine 142 the authority to access the documents stored there. Request processing module 210 may then invoke repository communicator 215 to obtain access to the specified repository using the received credentials, and download a document to be processed. In one embodiment, the user may additionally specify the document to be indexed in the request. In another embodiment, repository communicator 215 may begin downloading documents based on user defined configuration. For example, repository communicator 215 may obtain the most recently added document, the most recently updated document, or the like. Once obtained, repository communicator 215 may load the document into a memory space (or temporary storage space) of server 140 and invoke document processing module 220 to process the document.

Document processing module 220 may parse the obtained document to extract textual content, where the textual content is made up of multiple characters. In some implementations, once the textual content has been extracted, document processing module 220 may perform one or more data processing operations on the textual content to normalize the text. For example, document processing module 220 may remove punctuation characters from the textual content, convert uppercase characters to lowercase characters, remove symbolic characters from the textual content, or the like.

Document processing module 220 may additionally generate a unique identifier associated with the location of the document in the document repository. In some implementations, the unique identifier may indicate the storage repository that stores the document. For example, the unique identifier may include a uniform resource locator address (URL) of the document repository, the Internet Protocol (IP) address of the document repository, or other similar identifying information. Additionally, the unique identifier may indicate the location within the storage repository or on a client device where the document is stored (e.g., the directory structure within the filesystem of the client device or document repository). In one embodiment, in order to store the location information as a fixed length, document processing module may generate the unique identifier as a hash value of the location information. In some implementations, document processing module 220 may store the unique identifier and the associated document location information in search index data 153 to be used when conducting future searches of the document.

Document processing module 220 may further determine a unique user identifier associated with the user. For example, the unique user identifier may include a user authentication credential utilized by the user when accessing the document search engine 142 (e.g., a user sign-on). Alternatively, the unique user identifier may be an identifier associated with the client device that generated the request to index the user's documents. Document processing module 220 may subsequently store the textual content, unique document identifier, and unique user identifier in document text 152.

Referring now to document classifier 144, in some implementations, metadata extractor 255 may extract document metadata from each document processed. The document metadata may include the document title, author, date/time the document was created, or the like. Metadata extractor 255 may then invoke index builder 230 to index the textual content, the document metadata, unique document identifier, and document location to generate search index data 153 to be used to process subsequently received search queries of the textual content of the user's documents.

In one embodiment, feature vector module 260 generates feature vectors from the extracted metadata of each document. The feature vectors may be n-dimensional numerical representations of the extracted metadata values. The numerical representations facilitate processing and statistical analysis. The feature vectors allow for determination of a distance between any two documents, for example using a metric or distance function. In one embodiment, clustering module 265 groups the documents into a plurality of clusters that each include documents with similar characteristics. Clustering module 265 may compare the feature vectors to one another. If the vectors match, or are sufficiently similar, clustering module may group the corresponding documents into the same cluster. For example, clustering module 265 may apply a cluster analysis algorithm or a self-organizing map which determine the distance between feature vectors and group those with low distances into the same cluster. In one embodiment, clustering module 265 identifies a feature vector corresponding to a particular document that forms the center of each cluster. Clustering module 265 may group any documents having a feature vector within a threshold distance of the cluster center as being part of that cluster.

In some implementations, once clustering module 265 has grouped the documents into clusters using one of a number of unsupervised machine learning algorithms, classification module 270 determines a document classification for each of the plurality of clusters based on a subset of the documents in a respective cluster. In one embodiment, classification module 270 selects a number of example documents from a particular cluster and administrator interface 275 receives an indication of the document classification (e.g., from a system administrator or from another source). In one embodiment, classification module 270 accepts the received document classification and the results of the clustering process as being accurate and applies the received document classification to each of the other documents in the same cluster. Classification module 270 may store an indication of the classification in either search index data 153 or in metadata corresponding to each individual document.

In one embodiment, classification module 270 implements a supervised learning algorithm to classify the clustered documents. For example, classification module 270 may generate a learned classifier function based on the extracted metadata features and the received classification. The learned classifier function is a means of relating the metadata features to the classification in a way that can be applied to other sets of inputs (e.g., the metadata features of other documents). Classification module 270 can apply the learned classifier function to each of the stored documents in order to determine a document classification for each document. Given that the documents in a particular cluster share similar characteristics, it is likely that many of these documents will be classified the same as the example documents. If there are documents in the cluster that are not given the same classification, however, classification module 270 may notify clustering module 265, which may form a new cluster. Classification module 270 may then attempt to classify the documents in the new cluster in a similar fashion to that described above.

Referring again to document search engine 142, client communicator 205 may receive subsequent input text from a client device. The input text may be entered by a user as part of a search query via the user interface of the client device that is used to issue searches against the content (e.g., the text) of the user's stored documents, which are filtered by the document classification. Search query analyzer 235 may then be invoked to parse the query and identify any documents associated with the requesting user that include the text included in the query and are classified as the selected document classification. Search query analyzer 235 may then access search index data 153 to identify the unique document identifiers for any documents matching the search criteria. Search query analyzer 235 may additionally identify metadata associated with an identified document (e.g., document title) as well as the location of the document (e.g., the URL for the document within the document repository, the location of the document on the client device, etc.).

Response module 240 may be invoked to send a response to the client device. In various implementations, response module 240 may send the document identifier, the metadata, and/or the document location to the client device in response to the query.

Figure 3:
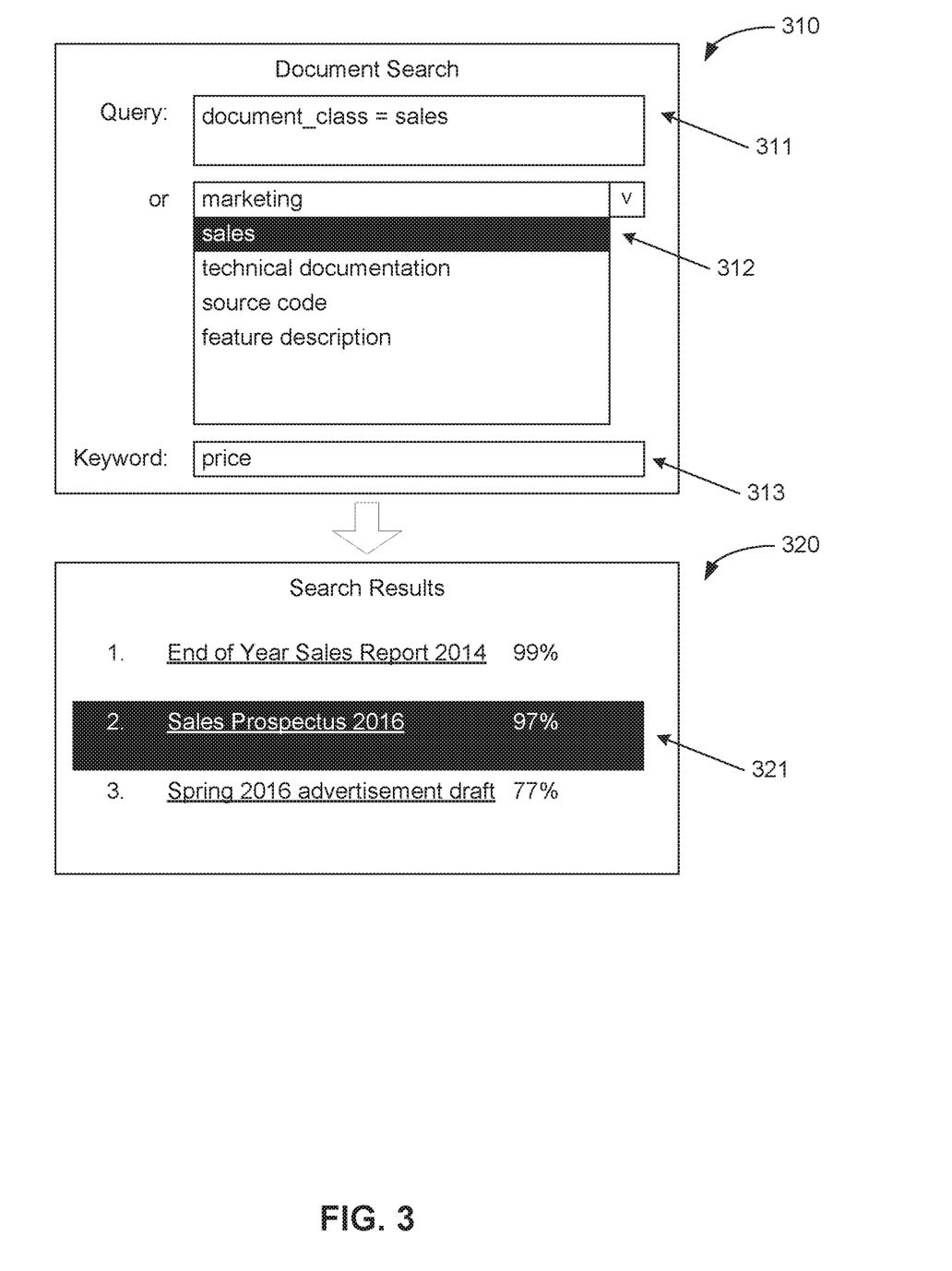
FIG. 3 is a diagram illustrating a document search interface using document class filters, according to an embodiment.

FIG. 3 is a diagram illustrating a document search graphical user interface (GUI) using document class filters, according to an embodiment. In some implementations, GUI 310 of client device 110 presents a document search interface, through which a user may provide a search query to be executed against documents in document repository 120 or data store 115. In one embodiment, the search query indicates a keyword and an indication of a document classification. In one embodiment, document search engine 142 causes presentation of the search GUI 310. The GUI 310 may include a search input field 311, a selectable menu 312 with a plurality of available document classification options, and a keyword search input field 313. In one embodiment, search input field 311 may receive a user input search query indicating the at least one of the document classification options. The search query may have a specific search syntax (e.g., "document_class=sales") or may be provide in a generic form (e.g., "sales"). Selectable menu 312 may be, for example, a drop down menu including a list of all available document classification options. The user may select one or more of the presented options for inclusion as a filter in the search query. Input field 313 can optionally receive a user input keyword or phrase. If a keyword is provided, the search of the electronic content may be limited to occurrences of the keyword in documents classified in the document class indicated using search input field 311, selectable menu 312, or both. In the illustrated embodiment, the document class "sales" has been selected from selectable menu 312 and the keyword "price" has been entered in keyword search input field 313. If no keyword is provided in field 113, document search engine 142 may locate documents classified as the selected document class, without regard to the particular words presented in those documents.

GUI 320 presents the results of the document search described above. In one embodiment, the search results include images of pages from the documents corresponding to the search parameters entered in GUI 310. In one embodiment, a list of documents that satisfy the search criteria is presented. In the illustrated example, GUI 320 includes a selectable list of documents classified as the selected document class "sales" and having the keyword price contained therein. Each entry in the list may also have a displayed probability indicating the likelihood that the corresponding document was correctly classified in the selected document class (i.e., "sales.") In one embodiment, the second result 321 may be selected by the user (e.g., using a mouse, trackpad, keyboard, or other user input device), as shown. In response to the selection of one of the search results from GUI 320, the corresponding document may be retrieved and opened for use by the user of client device 110.

In some implementations, the GUI 320 includes a GUI element (not shown) (e.g., an input field, a check box, a drop-down menu, etc.) that allows the user of client device 110 to indicate whether the classification of the document is accurate. This indication may be provided to the classification module 270 to more accurately classify subsequent documents.

FIGS. 4-7 are flow diagrams of various implementations of methods related to document classification and searching the contents of documents using document classification filters. The methods are performed by processing logic that may include hardware (circuitry, dedicated logic, etc.), software (such as is run on a general purpose computer system or a dedicated machine), or a combination of both. Some methods may be performed by document search engine 142 and/or document classifier 144 of FIGS. 1 and 2.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 4:
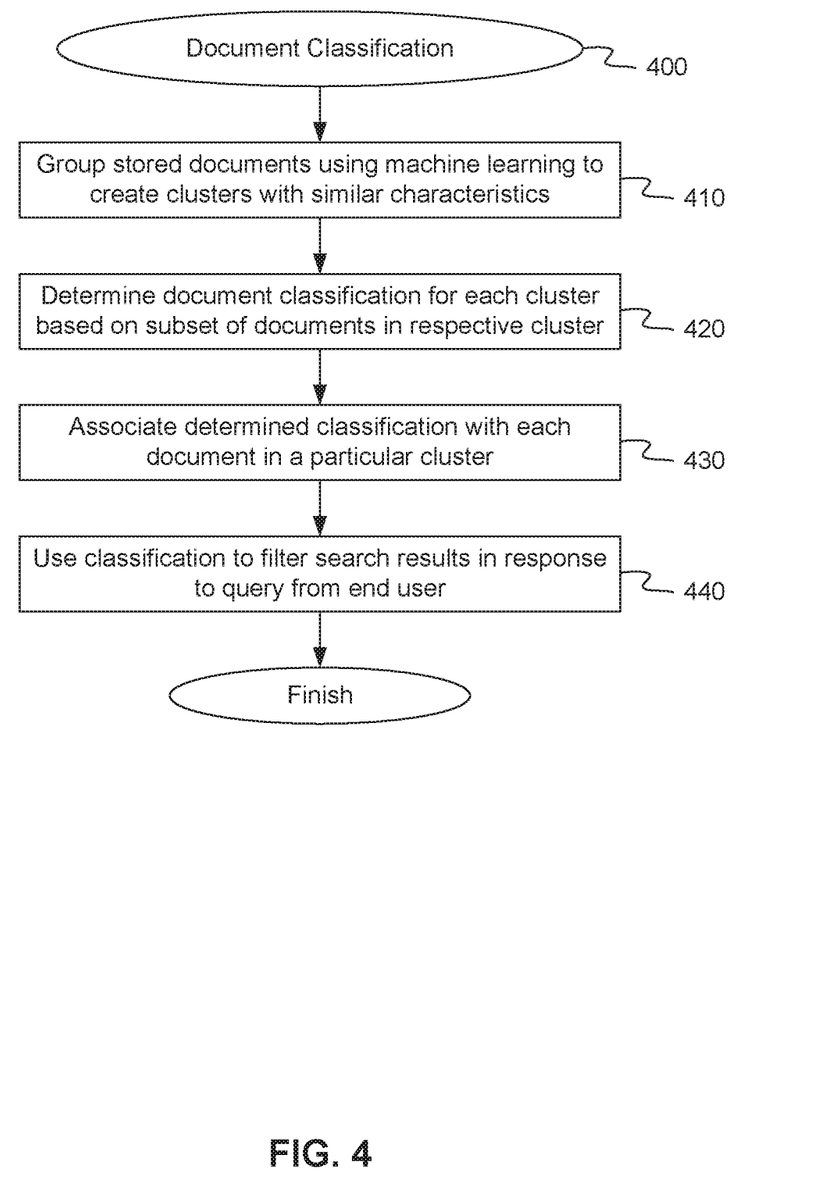
FIG. 4 is a flow diagram illustrating a method of document classification, according to an embodiment.

FIG. 4 is a flow diagram illustrating an embodiment for a method 400 of classifying a number of documents in a document repository. At block 410, method 400 groups a plurality of stored documents using machine learning to create a plurality of clusters that each include documents with similar characteristics. In one embodiment, the documents, for example including document 117 or document 121, may be documents belonging to a particular organization or individual and stored either in corporate file servers and workstations, such as document repository 120, or in personal cloud storage accounts or on a user's individual device, such as client device 110. In one embodiment, clustering module 265 of document classifier 144 groups the documents into clusters based on a similarity of particular metadata characteristics. Some examples of the characteristics used in clustering may include the document title, author, date/time the document was created, document mime type, document size, an indication of a certain number of normalized words having the highest count in the text (excluding proper nouns), an indication of words having a high term frequency-inverse document frequency (TF-IDF), an indication of a certain number of proper nouns appearing in in the text, the presence of certain symbols, word count, headings, or the like. Proper nouns are likely a strong indicator of the type of content in a document. The presence of the name of an individual or organization in a document can suggest to document classifier 144 the appropriate classification. For example, if the name of an engineer appears repeatedly in a document, it is likely that the document is an engineering document. Clustering module 265 may use one of a various unsupervised machine learning techniques such as a cluster analysis algorithm or a self-organizing map to group the documents into clusters. The resulting clusters may be representative of different document classifications. Additional details of the clustering process are provided below with respect to FIG. 5.

At block 420, method 400 determines a document class for each of the plurality of clusters based on a subset of the documents in a respective cluster. Examples of these classifications may include technical documentation, feature descriptions, source code, marketing documents, sales documents, etc. In one embodiment, classification module 270 selects one or more example documents from a certain cluster. The documents may be randomly selected or a certain sampling technique may be used, such as reservoir sampling. In one embodiment, administrator interface 275 may receive an indication of a classification of the subset of documents from a user, an administrator or other individual. For example, the administrator may examine the subset of documents and determine an applicable classification. In one embodiment, classification module 270 may implement a supervised machine learning process to generate a learned classifier function, based on the received classification of the example documents, and use this function to classify the remaining documents. In another embodiment, the learned classifier function may be generated from other documents having known classifications.

In one embodiment, the clustering and classification processes result in an indication of a probability that any particular document belongs to a given classification. Accordingly, one individual document may have a certain probability of belonging to multiple classifications (e.g., 58% that it is a marketing document and 42% that it is a sales document). In one embodiment, clustering module 265 may use an adjustable threshold to make the determination of which classification a certain document should belong. In one example, this threshold may be set at 55%, meaning that the document in the example above would be classified as a marketing document. In another example, the threshold may be set at 40%, meaning that the document in the example above would be classified as both a marketing document and a sales document. Additional details of the classification process are provided below with respect to FIG. 6.

At block 430, method 400 associates the determined document classification with each of the plurality of documents in a cluster. In one embodiment, index builder 230 adds an indication of the determined document classification to an entry corresponding to the respective document in search index data 153. In another embodiment, classification module 270 writes an indication of the determined document classification to metadata stored with the document itself, either in document repository 120 or data store 115 of client device 110.

At block 440, method 400 uses the resulting classifications to filter search results in queries of end users. In one embodiment, client communicator 205 of document search engine 142 receives input text from client device 110 and an indication of a selected document classification. The input text may be entered by a user as part of a search query via the user interface 310 of the client device that is used to issue searches against the stored documents, which are filtered by the document classification. Search query analyzer 235 may be invoked to parse the query and identify any documents that include the keywords included in the query and are classified as the selected document classification. Search query analyzer 235 may then access search index data 153 to identify the unique document identifiers for any documents matching the search criteria and return a list of those documents as filtered search results in response to a search query. In one embodiment, client communicator 205 may receive an initial search that is not filtered by document classification and may return an initial set of results. Client communicator 205 may subsequently receive a request to filter the initial set of results by document classification and may then return a subsequent, filtered set of results. Additional details of the document classification filtering process are provided below with respect to FIG. 7.

Figure 5:
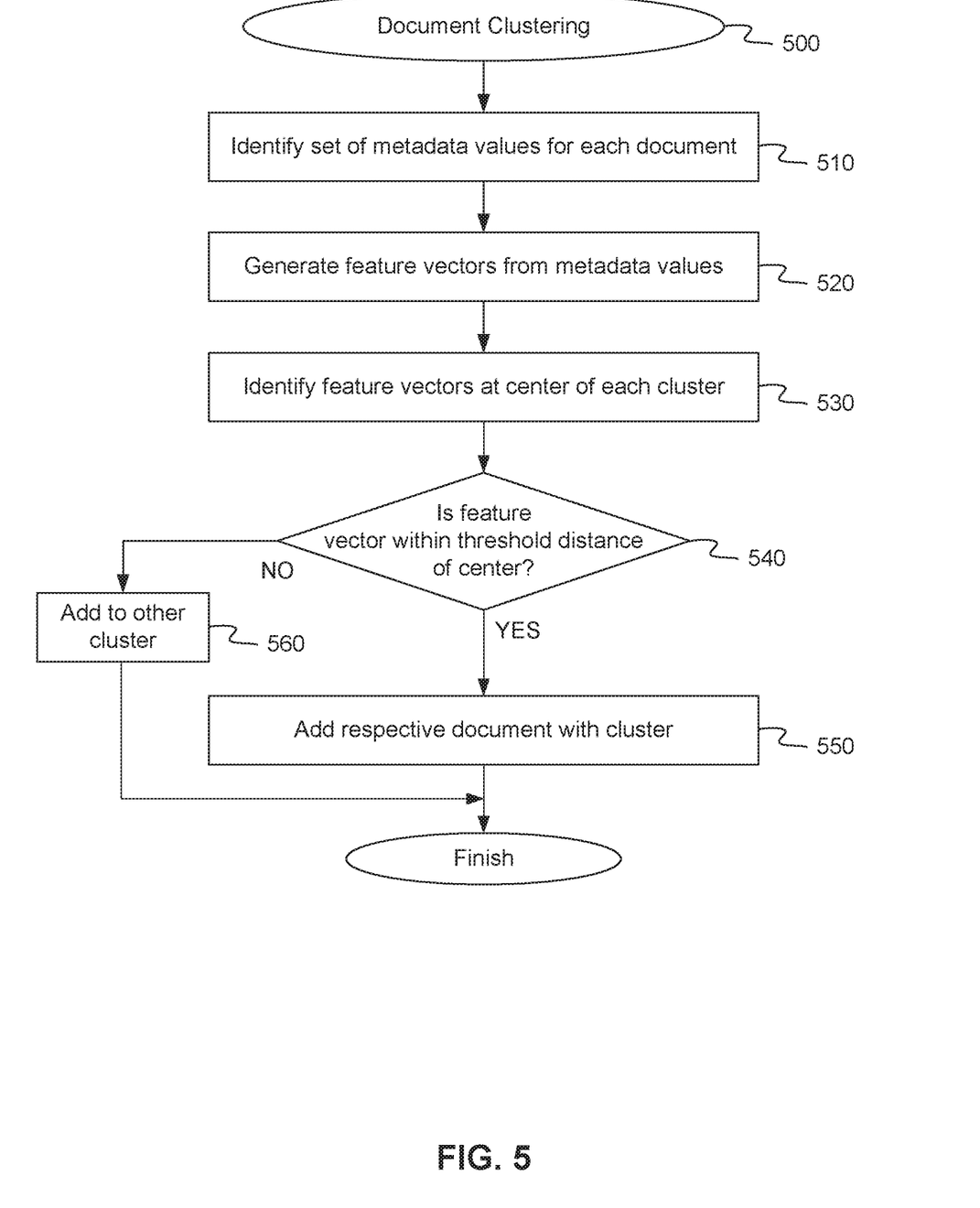
FIG. 5 is a flow diagram illustrating a method of document clustering, according to an embodiment.

FIG. 5 is a flow diagram illustrating a method 500 of document clustering, according to an embodiment. At block 510, method 500 identifies a set of metadata values for each document to be classified. In one embodiment, metadata extractor 255 scans the contents of a document, extracts certain characteristics and adds an indication of those characteristics to the documents metadata. Examples of the characteristics include the document title, author, date/time the document was created, document mime type, document size, an indication of a certain number of normalized words having the highest count in the text (excluding proper nouns), an indication of words having a high term frequency-inverse document frequency (TF-IDF), an indication of a certain number of proper nouns appearing in in the text, the presence of certain symbols, word count, headings, or other characteristics.

At block 520, method 500 generates a feature vector for each document based on the extracted metadata values. The feature vectors may be n-dimensional numerical representations of the extracted metadata values, which allow for determination of a distance between any two documents, for example using a metric or distance function.

At block 530, method 500 groups the documents into clusters based on the similarity of the feature vectors. In one embodiment, clustering module 265 compares the feature vectors to one another using any of a number of cluster analysis algorithms, such as centroid-based clustering, hierarchical clustering, distribution-based clustering, density-based clustering, etc. If the vectors match, or are sufficiently similar, clustering module may group the corresponding documents into the same cluster. For example, clustering module 265 may apply a cluster analysis algorithm or a self-organizing map which determine the distance between feature vectors and group those with low distances into the same cluster. In one embodiment, clustering module 265 identifies a feature vector corresponding to a particular document that forms the center of each cluster. At block 540, method 500 compares the distance between each other feature vector to the cluster center. Clustering module 265 may group any documents having a feature vector within a threshold distance of the cluster center as being part of that cluster. Thus, at block 550, method 500 adds a respective document to the current cluster if the feature vector is within the threshold distance of the cluster center. If the distance is greater than the threshold distance, at block 560, method 500 adds the respective document to a different cluster.

Figure 6:
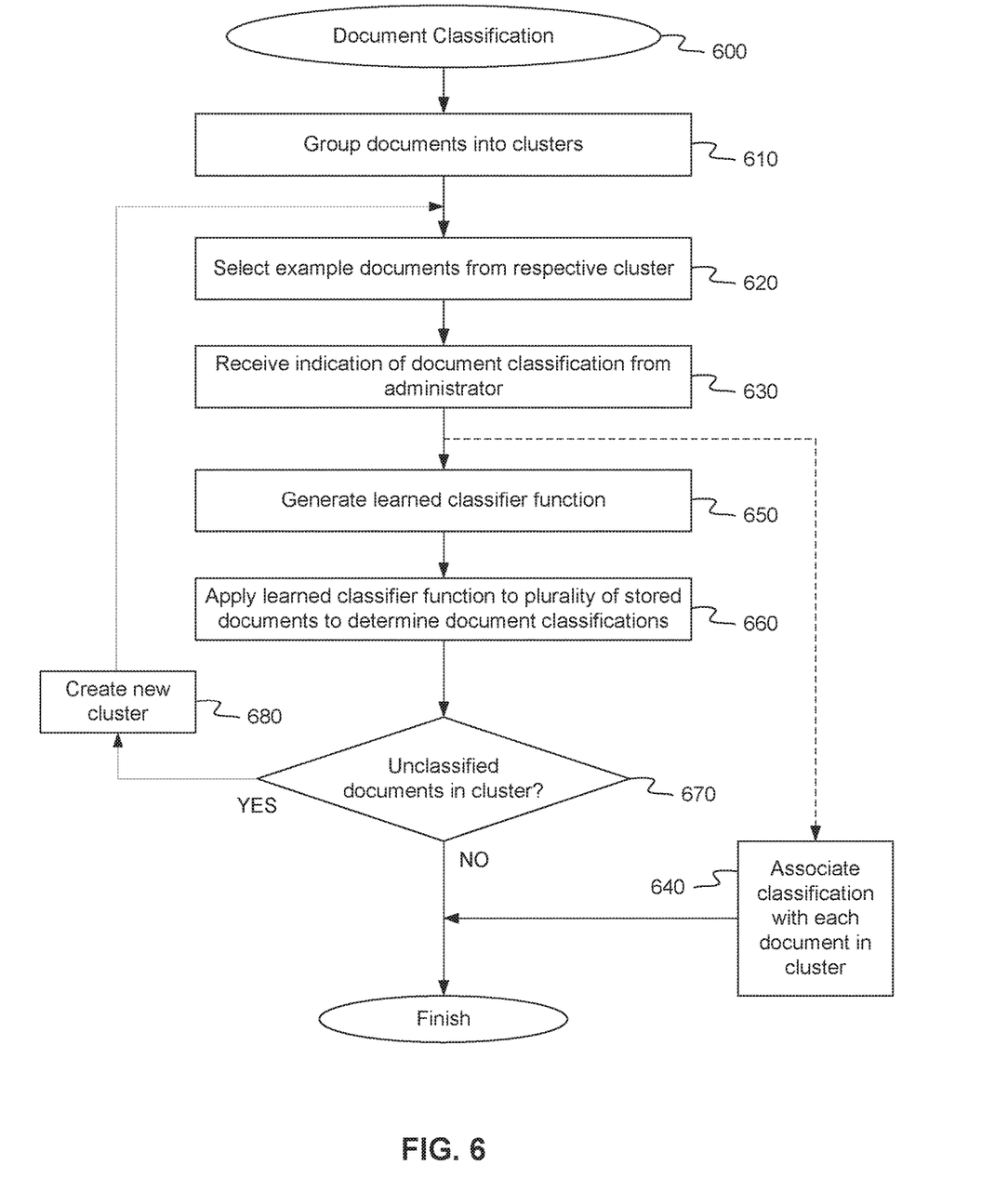
FIG. 6 is a flow diagram illustrating a method of document classification, according to an embodiment.

FIG. 6 is a flow diagram illustrating a method of document classification, according to an embodiment. At block 610, method 600 groups the documents into clusters, as described above with respect to FIG. 5. At block 620, method 600 selects a subset of the documents from given cluster to serve as example documents. In one embodiment, classification module 270 selects one or more example documents randomly or using some other sampling technique, such as reservoir sampling. Since all documents in a cluster have similar characteristics, the example documents may be representative of the remaining documents in the cluster. In one embodiment, classification module 270 selects example documents from each of the clusters identified at block 610.

At block 630, method 600 receives an indication of a document classification. In one embodiment, administrator interface 275 may receive an indication of a classification of the subset of documents from a user, an administrator or other individual. For example, the administrator may examine the subsets of documents from each cluster and determine an applicable classification. In one embodiment, at block 640, classification module 270 may associate the received classification with each document in the respective cluster. In another, embodiment, however, at block 650, classification module 270 may implement a supervised machine learning process to generate a learned classifier function, based on the received classification of the example documents. The learned classifier function is a means of relating the metadata features in a particular feature vector to the classification of the corresponding document in a way that can be applied to other sets of inputs (e.g., the metadata features of other documents). In one embodiment, the example documents from each identified cluster may be used to generate the learned classifier function.

In one embodiment, the learned classifier function is tested during a training phase. Over time, the learned classifier function can be applied to pre-classified documents (i.e., a training set) to determine whether the function is able to correctly classify the documents. In one embodiment, an administrator reviews the results of the function during the training phase and provides feedback on whether the classifications are correct or not. In one embodiment, the learned classifier function is modified during the training phase to reflect changes and improve its accuracy. The training phase may continue for a period of time until adding new data does not lead to significant changes in the results. At this point, the learned classifier function may be deemed ready for use.

At block 660, method 600 applies the learned classifier function to the stored documents to determine a document classification for each document. Once the learned classifier function has been properly trained, classification module 270 can apply the learned classifier function to each document in a particular cluster. In one embodiment, the metadata feature vector for a particular document serves as an input for the learned classifier function and a document classification is generated as the output of the function.

In one embodiment, some number of documents in a given cluster may not be classified the same as the other documents in the cluster by the learned classifier function. At block 670, method 600 determines whether any of these unclassified documents are found in the cluster. If there are unclassified documents, at block 680, method 600 may create a new cluster for those unclassified documents or attempt to add them to another existing cluster with the clustering algorithm used at block 610. Once the unclassified documents are assigned to a new cluster, they may be classified in the manner described above by performing the operations described in blocks 620-660.

Figure 7:
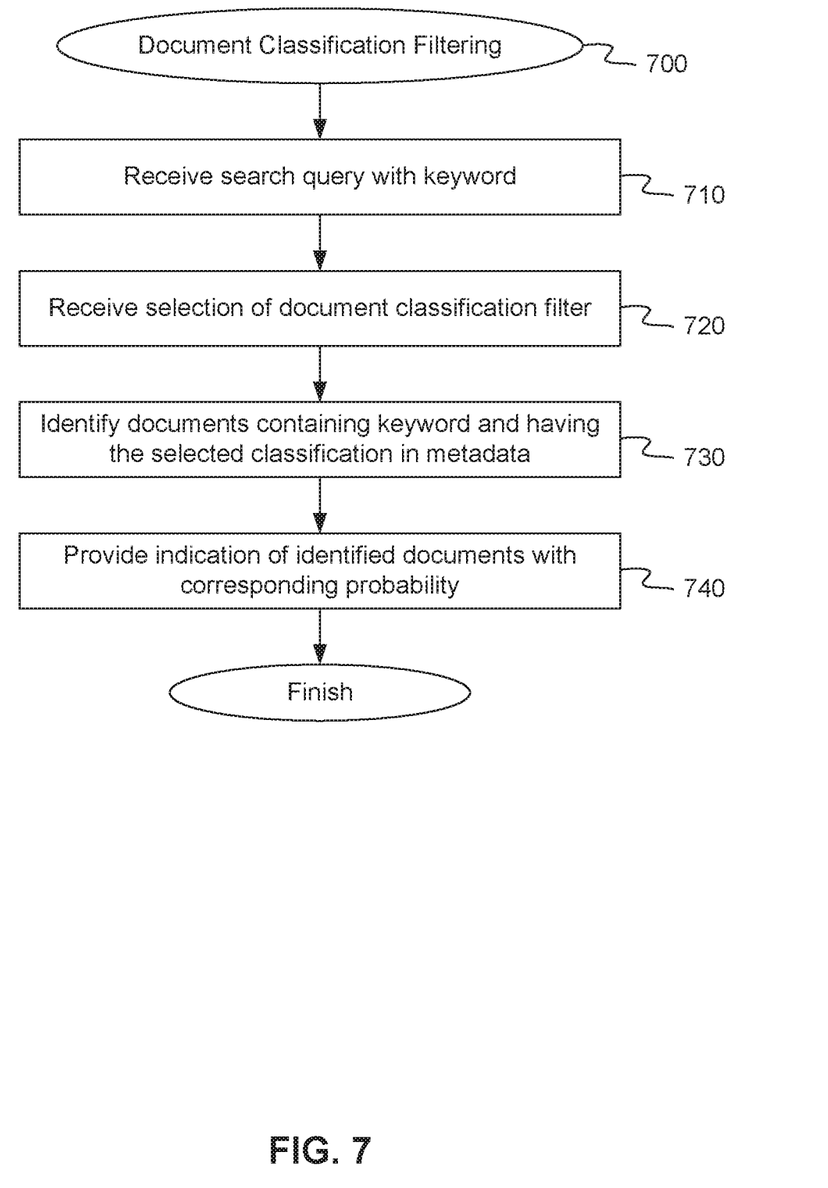
FIG. 7 is a flow diagram illustrating a method of document classification filtering, according to an embodiment.

FIG. 7 is a flow diagram illustrating a method 700 of document classification filtering, according to an embodiment. At block 710, method 700 receives a search query from a client device to search the textual content of the plurality of documents associated with the user. At block 720, method 700 receives a selection of a document classification filter. At block 730, method 700 identifies one or more document identifiers associated with textual content matching the search query and the document classification filter based on the search index. In one embodiment, processing logic can further identify documents that have a similar meaning to those explicitly matching the search query. For example, search query analyzer 235 may use a measure of cosine similarity to identify documents from the same classification that may be of interest to the user, even if they do not include the keywords included in the search query. For example, if there is a high number of the most popular normalized words for a given classification that appear in a document, that document may optionally be included in the search results. At block 740, method 700 provides an indication of the document identifiers associated with the textual content to the client device in response to the query.

Figure 8:
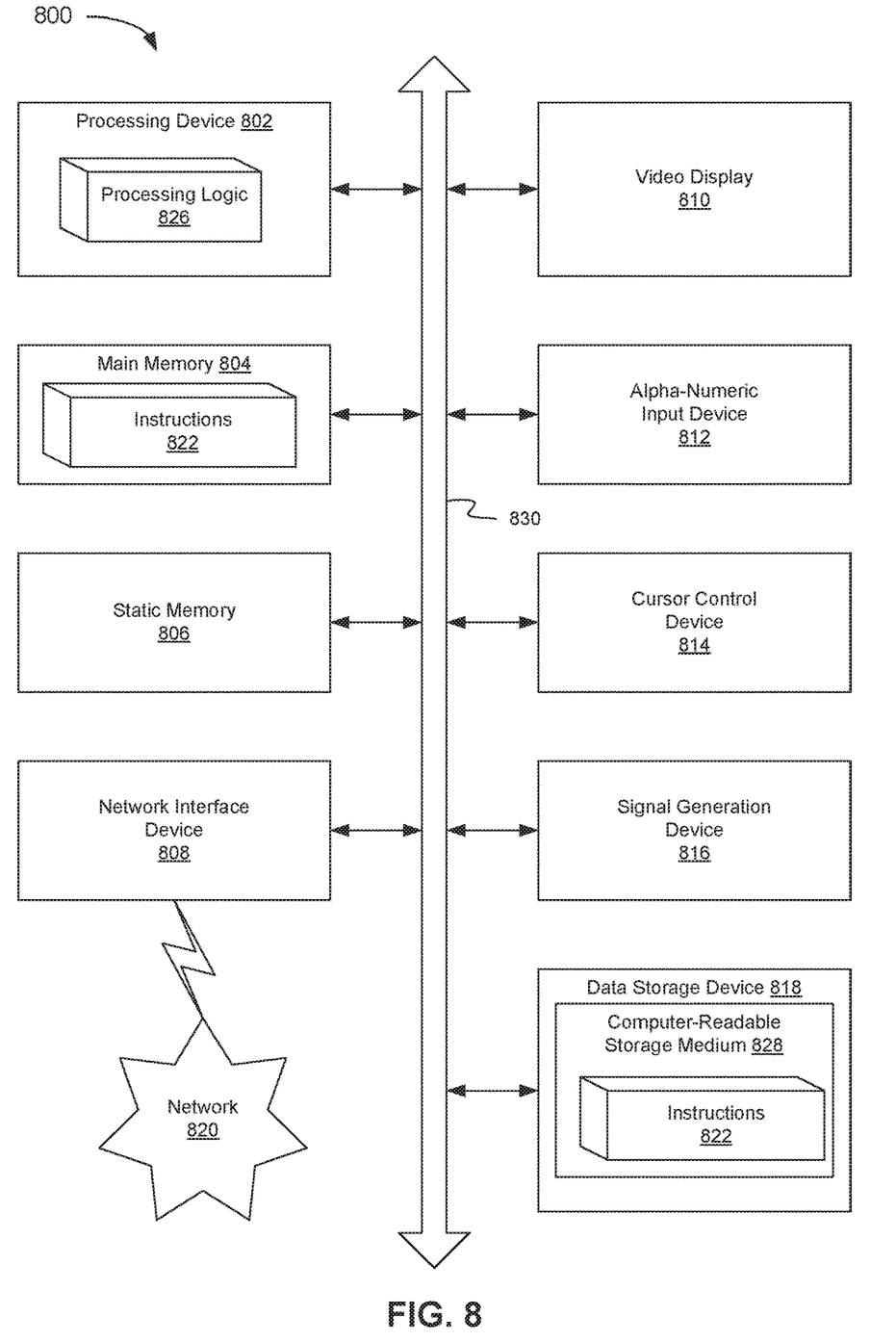
FIG. 8 is a block diagram illustrating an exemplary computer system on which embodiments of the present disclosure may be implemented.

FIG. 8 illustrates a diagrammatic representation of a machine in the exemplary form of a computer system 800 within which a set of instructions, for causing the machine to perform any one or more of the methodologies discussed herein, may be executed. For example, the instructions may cause the machine to perform document classification for use in filtering document search results. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may represent server 140 of FIGS. 1 and 2.

The exemplary computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein. In one embodiment, processing logic 826 is representative of document search engine 142 and/or document classifier 144 of FIGS. 1 and 2.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 (e.g., instructions of document search engine 142) embodying any one or more of the methodologies or functions described herein. The instructions 822 may also reside, completely or at least partially, within the main memory 804 and/or within processing logic 826 of the processing device 802 during execution thereof by the computer system 800, the main memory 804 and the processing device 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining", "maintaining", "analyzing", "receiving," "identifying," "determining," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method to facilitate a document classification filter for searching content of a plurality of stored documents, the method comprising:
   grouping, by a processing device, the plurality of stored documents using an unsupervised machine learning algorithm to create a plurality of clusters that each include documents having similar characteristics;
   selecting, using a sampling algorithm, a respective subset of the documents in each respective cluster formed using the unsupervised machine learning algorithm, wherein each respective subset of documents is selected using at least one of random sampling or reservoir sampling, and wherein each respective subset of documents is representative of remaining documents in the respective cluster from which the respective subset was selected;

receiving, as user input, an indication of a document classification of the respective subset of the documents in each respective cluster;

generating, using a supervised machine learning process, a plurality of learned classifier functions, wherein each learned classifier function corresponds to a respective cluster, and wherein each learned classifier function is trained using training data that comprises the characteristics of the respective subset of the documents selected from the corresponding respective cluster and the corresponding document classification received as user input;

applying the plurality of learned classifier functions to the plurality of stored documents across the plurality of clusters to determine a document classification for each of the plurality of stored documents, wherein resulting classifications of documents are used to filter search results in response to queries of end users;

identifying at least one document in a given cluster of the plurality of clusters, wherein a document classification for the at least one document, determined using a corresponding learned classifier function, is different than a document classification for other documents in the given cluster; and associating the at least one document with a new cluster of the plurality of clusters having a different document classification as determined by the corresponding learned classifier function.

2. The method of claim 1, wherein grouping the plurality of stored documents comprises applying at least one of a cluster analysis algorithm or a self-organizing map to the plurality of stored documents.

3. The method of claim 1, further comprising:
identifying metadata values for each of the plurality of stored documents; and
grouping the plurality of stored documents based on the metadata values, wherein documents in each of the plurality of clusters correspond to a different document classification.

4. The method of claim 3, wherein the metadata values comprise at least one of a document mime type, a document size, a number of words appearing most often, or a number of proper nouns.

5. The method of claim 1, further comprising:
receiving the queries for documents corresponding to a particular document classification, the queries comprising a keyword search term and an indication of the particular document classification; and
providing the search results comprising documents associated with the particular document classification and an indication of a probability that the documents are correctly associated with the particular document classification.

6. A server computing system comprising:
a memory; and
a processing device operatively coupled to the memory, the processing device to:
group a plurality of stored documents using an unsupervised machine learning algorithm to create a plurality of clusters that each include documents having similar characteristics;

select, using a sampling algorithm, a respective subset of the documents in each respective cluster formed using the unsupervised machine learning algorithm, wherein each respective subset of documents is selected using at least one of random sampling or reservoir sampling, and wherein each respective subset of documents is representative of remaining documents in the respective cluster from which the respective subset was selected;

receive, as user input, an indication of a document classification of the respective subset of the documents in each respective cluster;

generate, using a supervised machine learning process, a plurality of learned classifier functions, wherein each learned classifier function corresponds to a respective cluster, and wherein each learned classifier function is trained using training data that comprises the characteristics of the respective subset of the documents selected from the corresponding respective cluster and the corresponding document classification received as user input;

apply the plurality of learned classifier functions to the plurality of stored documents across the plurality of clusters to determine a document classification for each of the plurality of stored documents, wherein resulting classifications of documents are used to filter search results in response to queries of end users;

identify at least one document in a given cluster of the plurality of clusters, wherein a document classification for the at least one document, determined using a corresponding learned classifier function, is different than a document classification for other documents in the given cluster; and associate the at least one document with a new cluster of the plurality of clusters having a different document classification as determined by the corresponding learned classifier function.

7. The server computing system of claim 6, wherein to group the plurality of stored documents, the processing device to apply at least one of a cluster analysis algorithm or a self-organizing map to the plurality of stored documents.

8. The server computing system of claim 6, wherein the processing device further to:
identify metadata values for each of the plurality of stored documents; and
group the plurality of stored documents based on the metadata values, wherein documents in each of the plurality of clusters correspond to a different document classification.

9. The server computing system of claim 8, wherein the metadata values comprise at least one of a document mime type, a document size, a number of words appearing most often, or a number of proper nouns.

10. The server computing system of claim 6, wherein the processing device further to:
receive the queries for documents corresponding to a particular document classification, the queries comprising a keyword search term and an indication of the particular document classification; and
provide the search results comprising documents associated with the particular document classification and an indication of a probability that the documents are correctly associated with the particular document classification.

11. A non-transitory computer readable storage medium storing instructions that, when executed by a processing device of a client device, cause the processing device to:

group a plurality of stored documents using an unsupervised machine learning algorithm to create a plurality of clusters that each include documents having similar characteristics;

select, using a sampling algorithm, a respective subset of the documents in each respective cluster formed using the unsupervised machine learning algorithm, wherein each respective subset of documents is selected using at least one of random sampling or reservoir sampling, and wherein each respective subset of documents is representative of remaining documents in the respective cluster from which the respective subset was selected;

receive, as user input, an indication of a document classification of the respective subset of the documents in each respective cluster;

generate, using a supervised machine learning process, a plurality of learned classifier functions, wherein each learned classifier function corresponds to a respective cluster, and wherein each learned classifier function is trained using training data that comprises the characteristics of the respective subset of the documents selected from the corresponding respective cluster and the corresponding document classification received as user input;

apply the plurality of learned classifier functions to the plurality of stored documents across the plurality of clusters to determine a document classification for each of the plurality of stored documents, wherein resulting classifications of documents are used to filter search results in response to queries of end users;

identify at least one document in a given cluster of the plurality of clusters, wherein a document classification for the at least one document, determined using a corresponding learned classifier function, is different than a document classification for other documents in the given cluster; and associate the at least one document with a new cluster of the plurality of clusters having a different document classification as determined by the corresponding learned classifier function.

12. The non-transitory computer readable storage medium of claim 11, wherein to group the plurality of stored documents, the processing device to apply at least one of a cluster analysis algorithm or a self-organizing map to the plurality of stored documents.

13. The non-transitory computer readable storage medium of claim 11, wherein the processing device further to:

identify metadata values for each of the plurality of stored documents; and group the plurality of stored documents based on the metadata values, wherein documents in each of the plurality of clusters correspond to a different document classification.

14. The non-transitory computer readable storage medium of claim 13, wherein the metadata values comprise at least one of a document mime type, a document size, a number of words appearing most often, or a number of proper nouns.

* * * * *